United States Patent
Lin (10) Patent No.: US 10,019,528 B2
(45) Date of Patent: Jul. 10, 2018

(54) METHOD AND SYSTEM FOR SENDING WEBPAGE CONTENT WITH BROWSER BOOKMARK UNIFORM RESOURCE LOCATOR

(71) Applicant: TENCENT TECHNOLOGY (SHENZHEN) COMPANY LIMITED, Shenzhen, Guangdong (CN)

(72) Inventor: Xiaodan Lin, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 584 days.

(21) Appl. No.: 14/458,089

(22) Filed: Aug. 12, 2014

(65) Prior Publication Data

US 2014/0372500 A1    Dec. 18, 2014

Related U.S. Application Data

(63) Continuation of application No. PCT/CN2014/072980, filed on Mar. 6, 2014.

(30) Foreign Application Priority Data

Mar. 6, 2013    (CN) .......................... 2013 1 0071160

(51) Int. Cl.
*G06F 17/30* (2006.01)
*H04L 29/08* (2006.01)

(52) U.S. Cl.
CPC .. *G06F 17/30884* (2013.01); *G06F 17/30902* (2013.01); *H04L 67/10* (2013.01);
(Continued)

(58) Field of Classification Search
CPC ......... G06F 17/30884; G06F 17/30902; H04L 67/2847; H04L 67/2823; H04L 67/2895
See application file for complete search history.

(56) References Cited

U.S. PATENT DOCUMENTS 6,219,679 B1 *   4/2001   Brisebois .......... G06F 17/30855
                                                          707/E17.013
7,899,829 B1 *   3/2011   Malla ................ G06F 17/30884
                                                          707/741
(Continued)

FOREIGN PATENT DOCUMENTS

CN        101690128 A        3/2010
CN        102298599 A       12/2011
(Continued)

OTHER PUBLICATIONS

The World Intellectual Property Organization (WIPO) International Search Report for PCT/CN2014/072980 dated Jun. 30, 2014 3 Pages.

(Continued)

*Primary Examiner* — Aaron Strange
(74) *Attorney, Agent, or Firm* — Anova Law Group, PLLC (57) ABSTRACT

Exemplary embodiments relate to a field of network information technology. Described are a method and a system for sending webpage content of browser bookmark uniform resource locator (URL). The method includes the following steps: receiving browser bookmark URL information sent from a client, the browser bookmark URL information comprising a browser bookmark URL and a message indicating whether the client starts a function of webpage content offline downloading; determining whether a function of webpage content offline downloading of the client is started according to the prompting message; when the function of webpage content offline downloading of the client is client is started, extracting key webpage content of the webpage corresponding to the browser book mark URL; and sending the key webpage content to the client. The exemplary embodiments of present disclosure can save (Continued)

network traffic and improve a reading efficiency of the webpage corresponding to the bookmark URL.

24 Claims, 8 Drawing Sheets

(52) U.S. Cl.
CPC ...... *H04L 67/1097* (2013.01); *H04L 67/2823* (2013.01); *H04L 67/2842* (2013.01); *H04L 67/2847* (2013.01); *H04L 67/2861* (2013.01); *H04L 67/2895* (2013.01)

(56) References Cited

U.S. PATENT DOCUMENTS

2004/0205543 A1* 10/2004 Awada .............. G06F 17/30884
715/205
2012/0144315 A1 6/2012 Rosenberger et al.
2012/0216102 A1* 8/2012 Malla .................... G06F 17/241
715/206
2013/0332807 A1* 12/2013 Forstall ............. G06F 17/30884
715/205
2014/0059468 A1* 2/2014 Allgair ................ G06F 3/04842
715/771
2014/0129835 A1* 5/2014 Suryavanshi ........... H04L 51/14
713/168

FOREIGN PATENT DOCUMENTS

CN 102638570 A 8/2012
CN 102831144 A 12/2012

OTHER PUBLICATIONS

The State Intellectual Property Office of the People's Republic of China (SIPO), Office Action 1 for 201310071160.0, dated Feb. 26, 2018, 8 Pages (including translation).

* cited by examiner

METHOD AND SYSTEM FOR SENDING WEBPAGE CONTENT WITH BROWSER BOOKMARK UNIFORM RESOURCE LOCATOR

CROSS REFERENCE TO RELATED APPLICATIONS

This application is a U.S. continuation application under 35 U.S.C. § 111(a) claiming priority under 35 U.S.C. §§ 120 and 365(c) to International Application No. PCT/CN2014/072980 filed on Mar. 6, 2014, which claims the priority benefit of Chinese Patent Application No. 201310071160.0 filed on Mar. 6, 2013, the contents of which are incorporated by reference herein in their entirety for all intended purposes.

FIELD OF THE TECHNOLOGY

The present invention relates to a field of Internet technology, and specifically to a method and a system for sending webpage content of browser bookmark uniform resource locator (URL).

BACKGROUND

It is known that favorites are usually used to store bookmark URL. Users may visit a webpage corresponding to the bookmark URL and read webpage content of the bookmark URL without writing the bookmark URL on the paper using a pen or without remembering the bookmark URL. However, in practical application, when visiting the webpage corresponding to the bookmark URL, the webpage is reconnected that network traffic is wasted dramatically. Usually, a plenty of advertisements and links are carried with the webpage corresponding to the bookmark URL. Thus a reading efficiency of the webpage corresponding to the bookmark URL is reduced.

SUMMARY

A method for sending webpage content of browser bookmark URL is provided in the embodiments of present disclosure. The method of present disclosure can solve the problem described above, network traffic can be saved, and a reading efficiency of the webpage corresponding to the bookmark URL is increased.

According to a first aspect of embodiment of present disclosure, a method for sending webpage content of browser bookmark URL is provided. The method includes:

receiving browser bookmark URL information sent from a client, the browser bookmark URL information comprising a browser bookmark URL and a prompt message indicating whether the client starts a function of webpage content offline downloading;

determining whether a function of webpage content offline downloading of the client is started according to the prompting message; when the function of webpage content offline downloading of the client is determined to be started, extracting key webpage content of the webpage corresponding to the browser book mark URL;

sending the key webpage content to the client.

According to a second aspect of embodiment of present disclosure, a method for sending webpage content of browser bookmark URL is provided. The method includes:

receiving browser bookmark URL information sent from a client, the browser bookmark URL information comprising a browser bookmark URL and a prompt message indicating whether the client starts a function of webpage content offline downloading;

extracting key webpage content of the webpage corresponding to the browser book mark URL;

determining whether the function of webpage content offline downloading of the client is started according to the prompting message; when the function of webpage content offline downloading of the client is determined to be started, sending the key webpage content to the client.

A system for sending webpage content of browser bookmark URL is provided in the embodiments of present disclosure. The method of present disclosure can solve the problem description above, network traffic can be saved, and a reading efficiency of the webpage corresponding to the bookmark URL is increased.

According to a third aspect of embodiment of present disclosure, a system for sending webpage content of browser bookmark URL is provided. The system includes the following modules.

A receiving module which is configured to receive browser bookmark URL information sent from a client; the browser bookmark URL information at least comprising a bookmark URL and a prompting message indicating whether a function of webpage content offline downloading is started by the client.

A determining module which is configured to determine whether the function of webpage content offline downloading of the client is started according to the prompting message.

An extracting module which is configured to extract key webpage content of the webpage corresponding to the browser book mark URL when the function of webpage content offline downloading is determined to be started by the client.

A sending module which is configured to send the key webpage content to the client.

According to a fourth aspect of the embodiment of present disclosure, a system for sending webpage content of browser bookmark URL is provided. The system includes the following modules.

A receiving module which is configured to receive browser bookmark URL information sent from a client, the browser bookmark URL information at least comprises a bookmark URL and a prompting message indicating whether a function of webpage content offline downloading is started by the client An extracting module which is configured to extract key webpage content of the webpage corresponding to the browser bookmark URL.

A determining module which is configured to determine whether a function of webpage content offline downloading of the client is started according to the prompting message.

A sending module which is configured to send the key webpage content to the client, when the determining module determines the function of the webpage content offline downloading is started.

According to the embodiments of present disclosure, after the cloud server receives the browser bookmark URL sent synchronously by the client, when the function of webpage content offline downloading is started by the cloud server according to the prompting message of the browser bookmark URL information, the cloud server sends the key webpage content to the client. Herein the webpage content is extracted from the webpage corresponding to the browser bookmark URL. Or, after the cloud server receives the browser bookmark URL sent synchronously by the client, the cloud server extracts the key webpage content. And the webpage content offline downloading is determined to be started according to the prompting message included in the bookmark URL information, the key webpage content is sent to the client. From the description above, the webpage corresponding to the browser bookmark URL is visited by the client without reconnecting the internet. And the webpage content of the browser bookmark URL can also be read when the client is in an offline state. Thus, the network traffic is saved. Moreover, in the embodiment of present disclosure, only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

BRIEF DESCRIPTION OF THE DRAWINGS

In order to make embodiments of present disclosure more clearly, the drawings which are needed in the embodiments of present disclosure are described simply as follows. It is obviously, the drawings described as the follows are only exemplary embodiments of present disclosure. To a person of ordinary skill in the art, under premise of no creative work, other drawings may be obtained according to the drawings.

DETAILED DESCRIPTION OF ILLUSTRATED EMBODIMENTS

Further description of present disclosure will be illustrated clearly and completely, which combined with embodiments in drawings and detailed embodiment. Obviously, the embodiments here are not all the embodiments but only part of the embodiments of present disclosure. Based on the embodiments of present disclosure, under premise of without paying out creative work, other embodiments obtained by the person having ordinary skill in the art are considered to be encompassed within the scope of the present invention.

A method and a system for sending webpage content of browser bookmark URL are provided in exemplary embodiments of present disclosure. The method and the system for sending webpage content of browser bookmark URL can save network traffic of the user and improve the reading efficiency of reading the webpage content corresponding to the browser bookmark URL. The method and the system are described in details as the follows.

Figure 1:
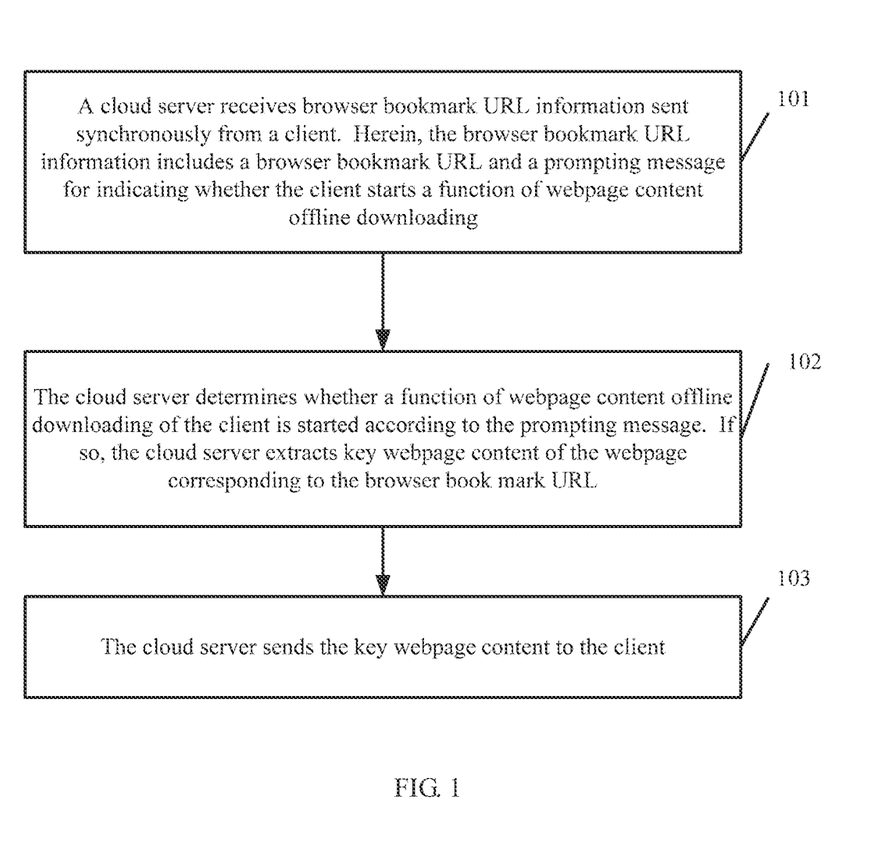
FIG. 1 is a flow chart of a method for sending webpage content of browser bookmark URL according to one embodiment of present disclosure.

Referring to FIG. 1, FIG. 1 is a flow chart of a method for sending webpage content of browser bookmark URL according to one embodiment of present disclosure. As shown in FIG. 1, the method may include the following steps.

Step 101, a cloud server receives browser bookmark URL information sent synchronously from a client. Herein, the browser bookmark URL information includes a browser bookmark URL and a prompting message for indicating whether the client starts a function of webpage content offline downloading.

In the embodiment of present disclosure, the client may be a fixed device or a mobile device. Herein, the fixed device may be personal computer (PC) or other fixed Internet device. The mobile device may be smart phone, personal digital assistant (PDA) and other mobile internet device (MID).

In the embodiment of present disclosure, a user logins the favorite of the browser using an account (such as an email account, a cloud account and a device account. etc., the cloud account may include an instant message account). The user clicks a "backup to cloud" widget to trigger the client to synchronously send the browser bookmark URL information to the cloud server. Herein, the browser bookmark URL information includes at least a browser bookmark URL stored in the favorite of the browser and a prompting message indicating whether a function of webpage content offline downloading is started by the client.

In the embodiment of present disclosure, when the user logins in the favorite of the browser by using the email account or the cloud account, triggers the client and sends the browser bookmark URL information to the cloud server, the user can login the favorite of the browser on any client by using the email account or the cloud account and download the browser bookmark URL from the cloud server. By means of this, the user can download the browser bookmark URL from different clients. When the user logins the favorite of the browser by using the device account, such as internet mobile equipment identity (IMEI) account, triggers the client and synchronously sends the browser bookmark URL information to the cloud server, the user can login the favorite of the browser on the client only by using the device account and download the browser bookmark URL from the cloud server. Thus, when the browser bookmark URL in the favorite of the browser on the client is lost (for example, a system of the client is reinstalled), the browser bookmark URL of the favorite can be recovered.

Step 102, the cloud server determines whether a function of webpage content offline downloading of the client is started according to the prompting message. If so, the cloud server extracts key webpage content of the webpage corresponding to the browser book mark URL.

In the embodiment of present disclosure, if the function of the webpage content offline downloading of the client is determined not started according to the prompting message by the cloud server, no operation is done by the cloud server.

In the embodiment of present disclosure, the key webpage content of the webpage extracted by the cloud server corresponding to the browser book mark URL can include the following content.

If the webpage corresponding to the browser bookmark URL is a webpage of forum, a theme and posts may be extracted by the cloud server. Thus the theme and the posts are the key webpage content of the webpage of the forum.

If the webpage corresponding to the browser bookmark URL is a webpage of e-commerce production, parameters of the production are extracted from the webpage of the e-commerce production by the cloud server. Thus, the parameters of the production are the key webpage content of the webpage of the e-commerce production.

If the webpage corresponding to the browser bookmark URL is a webpage of article, title of the article and the text of the article are extracted from the webpage of articles by the cloud server. Thus, the title of the article and the text of the article are key webpage content of the webpage of the article.

If the webpage corresponding to the browser bookmark URL is webpage of video, video content is extracted from the webpage of video by the cloud server. Thus, the video content is key webpage content of the webpage of the video.

Step 103, the cloud server sends the key webpage content to the client.

In the method for sending webpage content of browser bookmark URL shown in the FIG. 1, after the cloud server receives the browser bookmark URL information sent synchronously from the client, if the function of the webpage content offline downloading of the client is started by the cloud server according to the prompting message of the browser bookmark URL information, the cloud server sends the key webpage content to the client. Herein, the webpage content is extracted from the webpage corresponding to the browser bookmark URL. From described above, in the method for sending webpage content of browser bookmark URL shown in the FIG. 1, the webpage corresponding to the browser bookmark URL is visited by the client without reconnecting the internet. And the webpage content of the browser bookmark URL can also be read when the client is in an offline state. Thus, the network traffic is saved. Moreover, the method for sending webpage content of browser bookmark URL shown in the FIG. 1 only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

Figure 2:
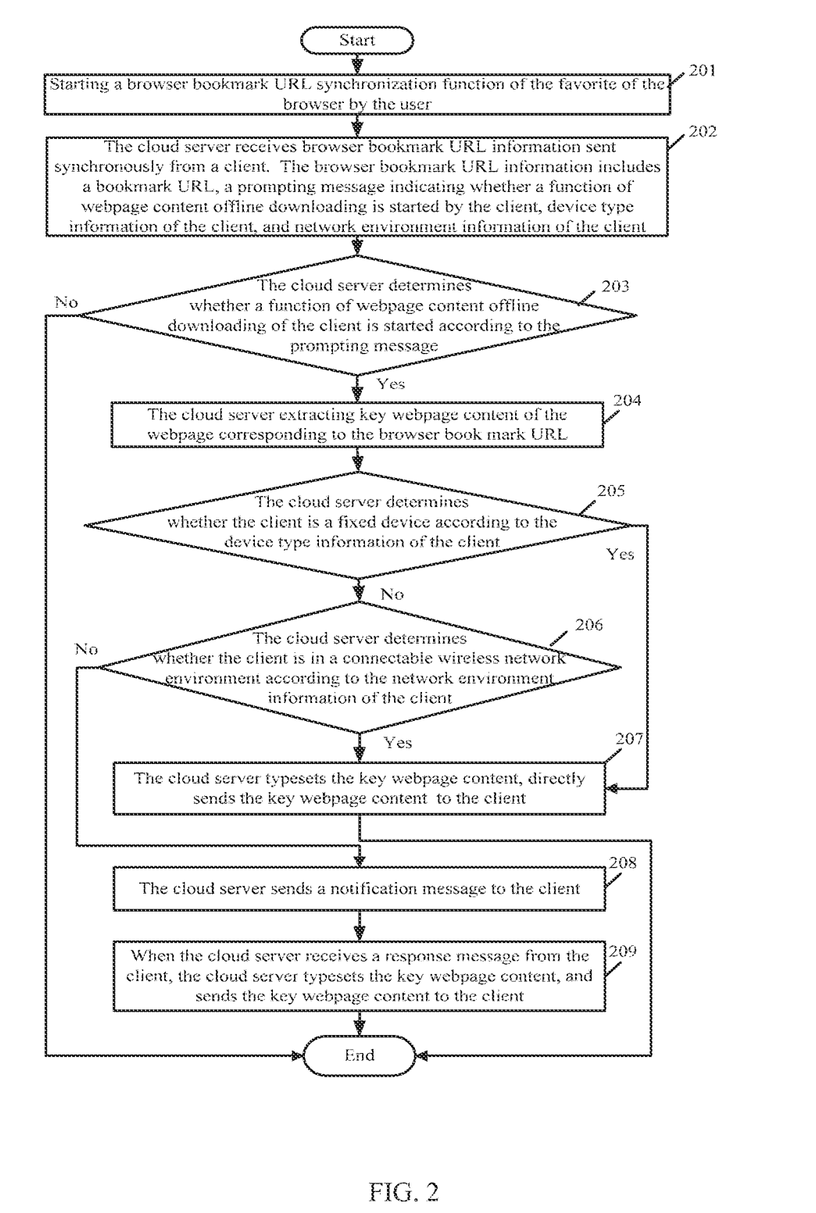
FIG. 2 is a flow chart of a method for sending webpage content of browser bookmark URL according to another embodiment of present disclosure.

Referring to FIG. 2, FIG. 2 is a flow chart of a method for sending webpage content of browser bookmark URL according to anther embodiment of present disclosure. As shown in the FIG. 2, the method includes the following steps.

Step 201, starting a browser bookmark URL synchronization function of the favorite of the browser by the user.

In the embodiment of present disclosure, the user logins the favorite of the browser by using the account to start the browser bookmark URL synchronization function of the favorite of the browser. For example, the account may be the email account, the cloud account, or the device account, etc.

Step 202, the cloud server receives browser bookmark URL information sent synchronously from a client. The browser bookmark URL information includes a bookmark URL, a prompting message for indicating whether a function of webpage content offline downloading is started by the client, device type information of the client, and network environment information of the client.

In the embodiment of present disclosure, after the user starts the browser bookmark URL synchronization function of the favorite of the browser, the user clicks the "backup to cloud" widget to trigger the client to synchronously send the browser bookmark URL information to the cloud server. Herein, the device type information of the client is configured to indicate whether the client is a fixed device or a mobile device. The network environment information of the client is configured to indicate a network type which the client is connected. Herein, the network type may be 2nd generation (2G), 3rd generation (3G), or wireless fidelity (WI-FI) etc.

In the embodiment of present disclosure, the cloud server stores the browser bookmark URL information to a bookmark database in background. The browser bookmark URL information is synchronously sent by the client. Herein, when the user logins by using the account, the browser bookmark URL information stored in the cloud server is sent to the local memory.

Step 203, the cloud server determines whether a function of webpage content offline downloading of the client is started according to the prompting message. If the function of webpage content offline downloading of the client is determined to be started according to the prompting message, a step 204 is implemented; otherwise, the procedure is ended.

Step 204, the cloud server extracting key webpage content of the webpage corresponding to the browser book mark URL. Then, a step 205 is implemented.

A detail process of extracting key webpage content of the webpage corresponding to the browser book mark URL by the cloud server is described in detail above, it is not repeated in the embodiment of present disclosure.

Step 205, the cloud server determines whether the client is a fixed device according to the device type information of the client. If the client is not a fixed device, that is, the device type information of the client is a mobile device, a step 206 is implemented, if the client is a mobile device, a step 207 is implemented.

Step 206, the cloud server determines whether the client is in a connectable wireless network environment (such as WI-FI) according to the network environment information of the client. If so, a step 207 is implemented; if not, a step 208 and a step 209 are implemented.

Step 207, the cloud server typesets the key webpage content, directly sends the key webpage content to the client, and then the procedure is ended.

Step 208, the cloud server sends a notification message to the client. The notification message is configured to prompt whether downloading the webpage content is allowable.

Step 209, when the cloud server receives a response message from the client, the cloud server typesets the key webpage content and sends the key webpage content to the client, and then the procedure is ended. The response message is configured to prompt the user downloading the webpage content is allowable.

From described above, in the method for sending webpage content of browser bookmark URL shown in the FIG. 2, the webpage corresponding to the browser bookmark URL is visited by the client without reconnecting the Internet. And the webpage content of the browser bookmark URL can also be read when the client is in an offline state. Thus, the network traffic is saved. Moreover, the method for sending webpage content of browser bookmark URL shown in the FIG. 2, only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

Figure 3:
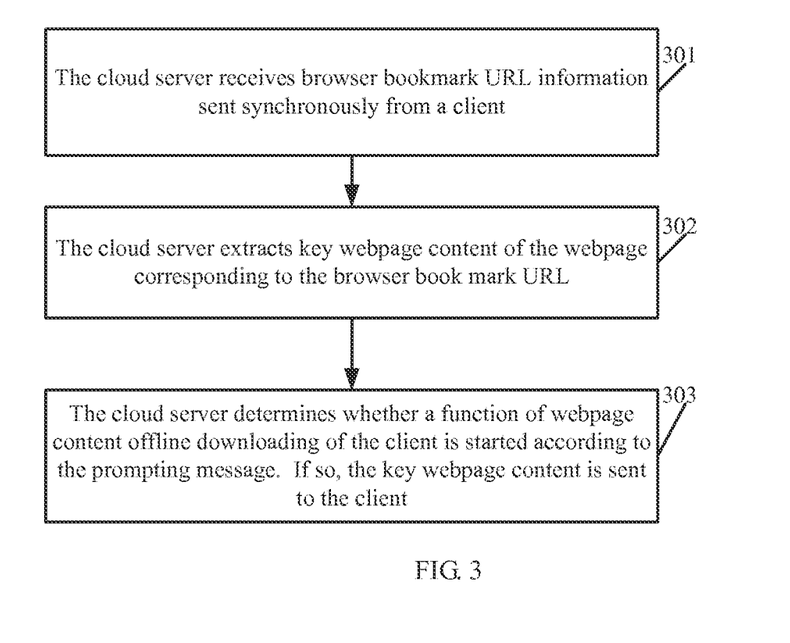
FIG. 3 is a flow chart of a method for sending webpage content of browser bookmark URL according to yet another embodiment of present disclosure.

Referring to FIG. 3, FIG. 3 is a flow chart of a method for sending webpage content of browser bookmark URL according to yet another embodiment of present disclosure. As shown in the FIG. 3, the method may include the following steps.

Step 301, the cloud server receives browser bookmark URL information sent synchronously from a client. The browser bookmark URL information includes a bookmark URL and a prompting message for indicating whether a function of webpage content offline downloading is started by the client.

Step 302, the cloud server extracts key webpage content of the webpage corresponding to the browser book mark URL.

In the embodiment of present disclosure, the key webpage content of the webpage extracted by the cloud server corresponding to the browser book mark URL can include the following content.

If the webpage corresponding to the browser bookmark URL is a webpage of forum, a theme and posts may be extracted by the cloud server. Thus, the theme and the posts are the key webpage content of the webpage of the forum.

If the webpage corresponding to the browser bookmark URL is a webpage of e-commerce production, parameters of the production are extracted from the webpage of the e-commerce production by the cloud server. Thus, the parameters of the production are the key webpage content of the webpage of e-commerce production.

If the webpage corresponding to the browser bookmark URL is a webpage of articles title of the article and the text of the article are extracted from the webpage of article by the cloud server. Thus, the title of the article and the text of the article are key webpage content of the webpage of the article.

If the webpage corresponding to the browser bookmark URL is webpage of video, video content is extracted from the webpage of video by the cloud server. Thus, the video content is key webpage content of the webpage of the video.

Step 303, the cloud server determines whether a function of webpage content offline downloading of the client is started according to the prompting message. If the function of webpage content offline downloading of the client is determined to be started according to the prompting message, the cloud server sends the key webpage content to the client.

In the embodiment of present disclosure, if the cloud server determines the function of webpage content offline downloading is not started by the client according to the prompting message, the cloud server will do nothing.

In the method for sending webpage content of browser bookmark URL shown in the FIG. 3, after the cloud server receiving the browser bookmark URL information sent synchronously from the client, the key webpage content can be extracted from the webpage corresponding to the browser bookmark URL, if the function of the webpage content offline downloading of the client is started by the cloud server according to the prompting message of the browser bookmark URL information, then the cloud server sends the key webpage content to the client. Herein, the webpage content is extracted form the webpage corresponding to the browser bookmark URL. From described above, in the method for sending webpage content of browser bookmark URL shown in the FIG. 3, the webpage corresponding to the browser bookmark URL is visited by the client without reconnecting the internet. And the webpage content of the browser bookmark URL can also be read when the client is in an offline state. Thus, the network traffic is saved. Moreover, the method for sending webpage content of browser bookmark URL shown in the FIG. 3 only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

Figure 4:
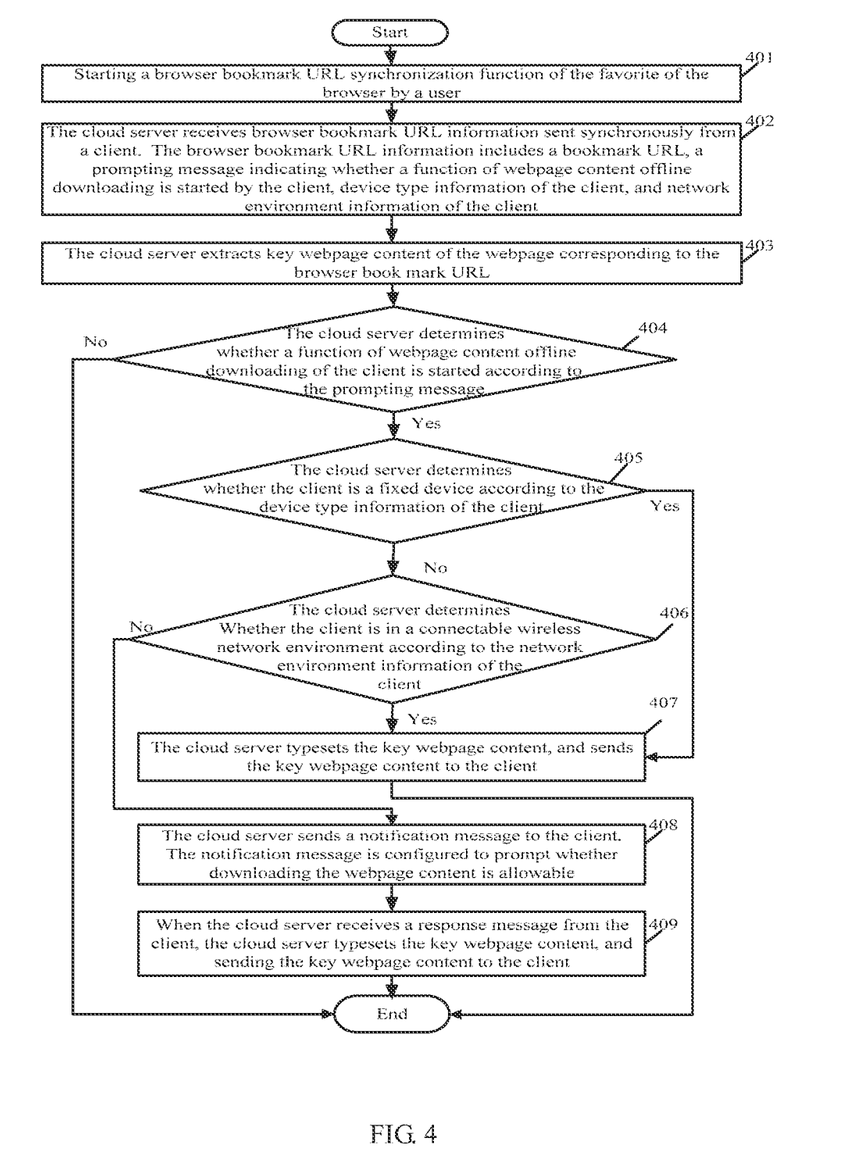
FIG. 4 is a flow chart of a method for sending webpage content of browser bookmark URL according to yet another embodiment of present disclosure.

Referring to FIG. 4, FIG. 4 is a flow chart of a method for sending webpage content of browser bookmark URL according to yet another embodiment of present disclosure. The method includes the following steps.

Step 401, starting a browser bookmark URL synchronization function of the favorite of the browser by a user.

In the embodiment of present disclosure, the user logins the favorite of the browser by using the account to start the browser bookmark URL synchronization function of the favorite of the browser. For example, the account may be the email account, the cloud account, or the device account, etc.

Step 402, the cloud server receives browser bookmark URL information sent synchronously from a client. The browser bookmark URL information includes a bookmark URL, a prompting message for indicating whether a function of webpage content offline downloading is started by the client, device type information of the client, and network environment information of the client.

Step 403, the cloud server extracts key webpage content of the webpage corresponding to the browser book mark URL. Then, a step 404 is implemented.

A detail process of extracting key webpage content of the webpage corresponding to the browser book mark URL by the cloud server is described in detail above, it is not repeated in the embodiment of present disclosure.

Step 404, the cloud server determines whether a function of webpage content offline downloading of the client is started according to the prompting message. If the function of webpage content offline downloading of the client is determined to be started according to the prompting message, a step 405 is implemented; otherwise, otherwise, the procedure is ended.

Step 405, the cloud server determines whether the client is a fixed device according to the device type information of the client. If the client is not a fixed device, that is, the device type information of the client is a mobile device, a step 406 is implemented, if the client is a mobile device, a step 407 is implemented.

Step 406, the cloud server determines whether the client is in a connectable wireless network environment (such as WI-FI) according to the network environment information of the client. If so, a step 407 is implemented, if not, a step 408 and a step 409 are implemented.

Step 407, the cloud server typesets the key webpage content, and directly sends the key webpage content to the client, and then the procedure is ended.

Step 408, the cloud server sends a notification message to the client. The notification message is configured to prompt whether downloading the webpage content is allowable.

Step 409, when the cloud server receives a response message from the client, the cloud server typesets the key webpage content, and sending the key webpage content to the client, and then the procedure is ended. The response message is configured to prompt the user downloading the webpage content is allowable.

From described above, the method for sending webpage content of browser bookmark URL shown in the FIG. 2 only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

Figure 5:
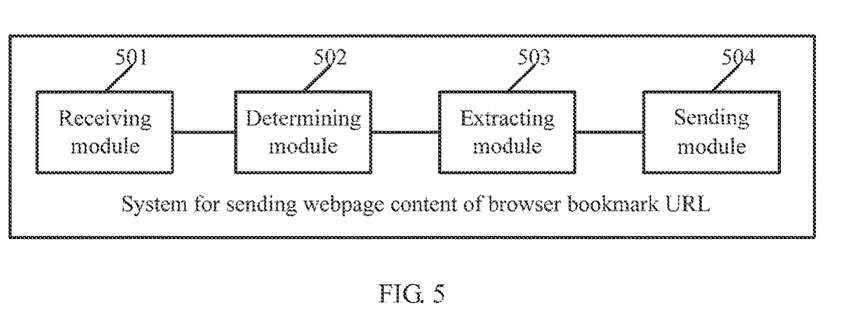
FIG. 5 is a schematic diagram of a system for sending webpage content of browser bookmark URL according to one embodiment of present disclosure.

Referring to FIG. 5, FIG. 5 is a schematic diagram of a system for sending webpage content of browser bookmark URL according to one embodiment of present disclosure. The system is configured to implement the method for sending webpage content of browser bookmark URL in the embodiments of present disclosure. As shown in FIG. 5, the system for sending webpage content includes the following modules.

A receiving module 501, which is configured to receive browser bookmark URL information sent synchronously from a client. The browser bookmark URL information at least includes a bookmark URL and a prompting message for indicating whether a function of webpage content offline downloading is started by the client.

A determining module 502, which is configured to determine whether a function of webpage content offline downloading of the client is started according to the prompting message.

An extracting module 503, which is configured for extract key webpage content of the webpage corresponding to the browser book mark URL when the function of webpage content offline downloading is determined to be started by the client.

A sending module 504, which is configured to send the key webpage content to the client.

In another exemplary embodiment, the extracting module 504 is further configured to typeset the key webpage content before sending the key webpage content to the client.

In the embodiment of present disclosure, when the determining module 502 determines the function of webpage content offline downloading is started by the client, if the webpage corresponding to the browser bookmark URL is a webpage of forum, the extracting module 503 is further configured to extract a theme and posts from the webpage of forum. Thus, the theme and the posts are the key webpage content of the webpage of the forum.

When the determining module 502 determines the function of webpage content offline downloading is started by the client, if the webpage corresponding to the browser bookmark URL is a webpage of e-commerce production, the extracting module 503 is further configured to extract parameter of the production from the webpage of e-commerce production. Thus, the parameter of the production is the key webpage content of the webpage of the e-commerce production.

When the determining module 502 determines the function of webpage content offline downloading is started by the client, if the webpage corresponding to the browser bookmark URL is a webpage of articles, the extracting module 503 is further configured to extract title of the article and the text of the article from the webpage of article. Thus, the title of the article and the text of the article are key webpage content of the webpage of the articles.

When the determining module 502 determines function of webpage content offline downloading is started by the client, if the webpage corresponding to the browser bookmark URL is a webpage of video, the extracting module 503 is further configured to extract video content of the webpage of video. Thus, the video content is key webpage content of the webpage of the video.

Figure 6:
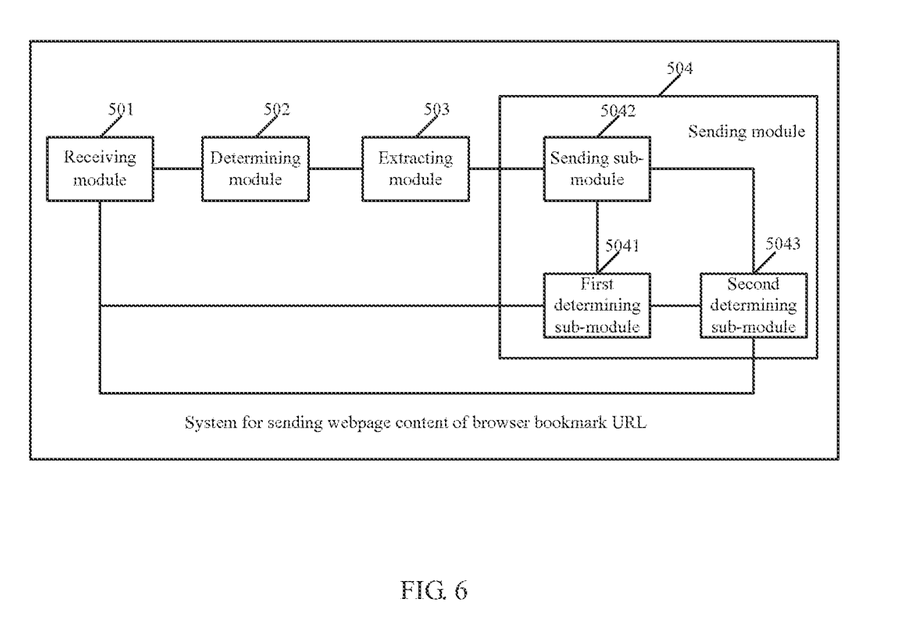
FIG. 6 is a schematic diagram of a system for sending webpage content of browser bookmark URL according to another embodiment of present disclosure.

Referring also to the FIG. 6, FIG. 6 is a schematic diagram of a system for sending webpage content of browser bookmark URL according to another embodiment of present disclosure. The system for sending webpage content of browser bookmark URL shown in FIG. 6 is optimized from the system for sending webpage content of browser bookmark URL shown in FIG. 5. In the system for sending webpage content of browser bookmark URL shown in FIG. 6, if the browser bookmark URL information includes device type information of the client and network environment information of the client, the sending module 504 includes the following sub-modules.

A first determining sub-module 5041, which is configured to determine a device type of the client according to the device type information of client. The device type of the client is fixed device or mobile device.

That is, the first determining sub-module 5041 determines the device type of the client according to the device type information of the client. The device type information of the client is included in the browser bookmark URL information received by the receiving module 501.

A sending sub-module 5042, which is configured to typeset the key webpage content, and directly send the key webpage content typeset to the client, when the device type of the client is determined to be a fixed device by the first determining sub-module 5041.

In another embodiment, the sending module 504 of the cloud server shown in FIG. 6 may further include the following sub-modules.

A second determining sub-module 5043, which is configured to determine whether the client is in a connectable wireless network environment (such as WI-FI) according to the network environment information of the client, when the device type of the client is determined to be a mobile device by the first determining sub-module 5041.

That is, when the device type of the client is determined to be a mobile device by the first determining sub-module 5041, the second determining sub-module 5043 determines whether the client is in a connectable wireless network environment (such as WI-FI) according to the network environment information. Herein, the device type of the client is included in the browser bookmark URL information received by the receiving module 501. And the network environment information is included in the browser bookmark URL information received by the receiving module 501.

Correspondingly, when the device type of the client is determined to be a mobile device by the first determining sub-module 5041 and the client is determined to be in the connectable wireless network environment (such as WI-FI) by the second determining sub-module 5042, the sending sub-module 5042 is also configured to directly send the key webpage content to the client.

In another embodiment, when the device type of the client is determined to be a mobile device by the first determining sub-module 5041 and the client is determined to be in the non-connectable wireless network environment (such as WI-FI) by the second determining sub-module 5043, the sending sub-module 5042 is further configured to send a notification message to the client. The notification message is configured to prompt whether downloading the webpage content is allowable. And the sending sub-module 5042 is further configured to send the key webpage content to the client, when receiving a response message from the client. The response message is configured to prompt the user downloading the webpage content is allowable.

From described above, in the system for sending webpage content of browser bookmark URL shown in the FIG. 5 and FIG. 6, the webpage corresponding to the browser bookmark URL is visited by the client without reconnecting the Internet. And the webpage content of the browser bookmark URL can also be read when the client is in an offline state. Thus, the network traffic is saved. Moreover, the system for sending webpage content of browser bookmark URL shown in the FIG. 5 and FIG. 6, only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

Figure 7:
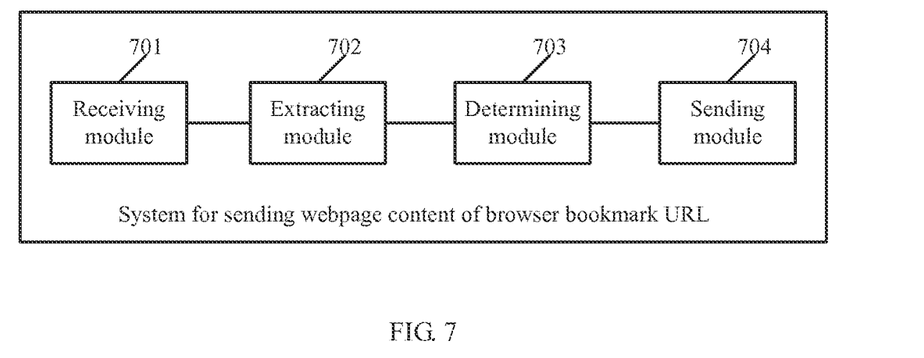
FIG. 7 is a schematic diagram of a system for sending webpage content of browser bookmark URL according to yet another embodiment of present disclosure.

Referring to FIG. 7, FIG. 7 is a schematic diagram of a system for sending webpage content of browser bookmark URL according to yet another embodiment of present disclosure. The system is configured to implement the method for sending webpage content of browser bookmark URL in the embodiments of present disclosure. As shown in FIG. 7, the system for sending webpage content includes the following modules.

A receiving module 701, which is configured to receive browser bookmark URL information sent synchronously from a client. The browser bookmark URL information at least includes a bookmark URL and a prompting message for indicating whether a function of webpage content offline downloading is started by the client.

An extracting module 702, which is configured to extract key webpage content of the webpage corresponding to the browser book mark URL.

A determining module 703, which is configured to determine whether a function of webpage content offline downloading of the client is started according to the prompting message A sending module 704, which is configured to send the key webpage content to the client, when the determining module 703 determines the function of webpage content offline downloading is started.

In the embodiment of present disclosure, extracting key webpage content of the webpage corresponding to the browser book mark URL by the cloud server may include the following content.

If the webpage corresponding to the browser bookmark URL is a webpage of forum, the key webpage content of the webpage is theme and posts of the webpage of forum.

If the webpage corresponding to the browser bookmark URL is a webpage of e-commerce production, the key webpage content of the webpage are parameters of production of the webpage of e-commerce production.

If the webpage corresponding to the browser bookmark URL is a webpage of article, the key webpage content of the webpage is title of the article and the text of the article.

If the webpage corresponding to the browser bookmark URL is a webpage of video, the key webpage content of the webpage is video content of the webpage of the video.

Figure 8:
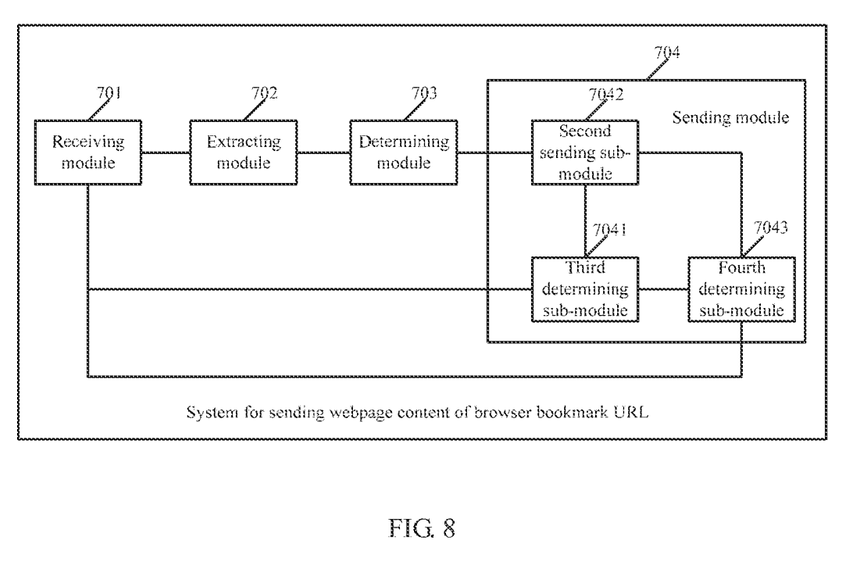
FIG. 8 is a schematic diagram of yet another for sending webpage content of browser bookmark URL according to yet another embodiment of present disclosure.

Referring also to the FIG. 8, FIG. 8 is a schematic diagram of a system for sending webpage content of browser bookmark URL according to yet another embodiment of present disclosure. The system for sending webpage content of browser bookmark URL shown in FIG. 8 is optimized from the system for sending webpage content of browser bookmark URL showing in the FIG. 7. In the system for sending webpage content of browser bookmark URL showing in the FIG. 8, the browser bookmark URL information includes device type information of the client and network environment information of the client, the sending module 704 includes the following sub-modules.

A third determining sub-module 7041, which is configured to determine a device type of the client according to the device type information of client, when the function of webpage content offline downloading is determined to be started by the determining module 703.

That is, when the function of the webpage content offline downloading is determined to be started by the determining module 703, the third determining sub-module 7041 determines the device type of the client according to the device type information of the client. The device type information of the client is included in the browser bookmark URL information received by the receiving module 701.

A second sending sub-module 7042, which is configured to directly send the key webpage content to the client, when the device type of the client is determined to be a fixed device by the third determining sub-module 7042.

In another embodiment, the sending module 704 of the cloud server shown in FIG. 8 further includes the following sub-modules.

A fourth determining sub-module 7043, which is configured to determine whether the client is in a connectable wireless network environment (such as WI-FI) according to the network environment information of the client, when the device type of the client is determined to be a mobile device by the third determining sub-module 7041.

That is, when the device type of the client is determined to be a mobile device by the third determining sub-module 7041, the fourth determining sub-module 7043 determines whether the client is in a connectable wireless network environment (such as WI-FI) according to the network environment information. Herein, the network environment information is included in the browser bookmark URL information received by the receiving module 701.

The second sending sub-module 7042 is further configured to directly send the key webpage content to the client, when the device type of the client is determined to be a mobile device by the third determining sub-module 7041 and the client is determined in the connectable wireless network environment (such as WI-FI) by the third determining sub-module 7043.

In the embodiment of present disclosure, when the device type of the client is determined to be a mobile device by the third determining sub-module 7041 and the client is determined in the non-connectable wireless network environment by the fourth determining sub-module 7043, the sending sub-module 7042 is further configured to send a notification message to the client. The notification message is configured to prompt whether downloading the webpage content is allowable. And the sending sub-module 7042 is further configured to send the key webpage content to the client, when receiving a response message form the client from the client. The response message is configured to prompt the user downloading the webpage content is allowable.

From described above, in the system for sending webpage content of browser bookmark URL shown in FIG. 7 and FIG. 8, the webpage corresponding to the browser bookmark URL is visited by the client without reconnecting the internet. And the webpage content of the browser bookmark URL can also be read when the client is in an offline state. Thus, the network traffic is saved. Moreover, the system for sending webpage content of browser bookmark URL shown in the FIG. 7 and FIG. 8 only the key webpage content of the web corresponding to the browser bookmark URL is sent to the client. The advertisements and the links of the webpage corresponding to the browser bookmark URL are avoided to send to the client. Thus, the reading efficiency of the webpage corresponding to the bookmark URL is increased.

It is understood to a person of ordinary in the art, part of or all of the steps in each method of the above embodiments may be implemented by a hardware which is related to computer programs. The programs may be stored in a computer readable storage medium. Herein, the storage media may be a flash disk, a read-only memory (ROM), a random access memory (RAM), a disk or a compact disk (CD).

From the above description, the method and cloud server for sending webpage content of browser bookmark URL are detailed illustrated with the embodiments of present disclosure. While the principle and the implementation of the present disclosure is described with reference to particular embodiments, it is understand that the embodiments are only helped to make understand of the method and core idea of the present disclosure. To a person of ordinary skill in the art, such alternate embodiments are considered to be encompassed within the spirit and scope of present invention.

What is claimed is:

1. A method for sending webpage content of browser bookmark uniform resource locator (URL), comprising:
    logging in, by a local browser application on a client of a user, a user to a favorites folder of the local browser application, wherein the favorites folder stores a bookmark favorited by the user;
    triggering, by the local browser application, a browser bookmark URL synchronization function for synchronizing the bookmark with a cloud server after the user logins the favorites folder, wherein information being synchronized by the browser bookmark URL synchronization function includes a browser bookmark URL of the bookmark, and excludes content of a webpage corresponding to the bookmark;
    receiving, by the cloud server, browser bookmark URL information, the browser bookmark URL information comprising the browser bookmark URL of the bookmark and a prompting message indicating whether a function of webpage content offline downloading is activated in the client;
    determining whether the function of webpage content offline downloading of the client is activated according to the prompting message;
    in response to determining that the prompting message indicates the function of webpage content offline downloading is activated, extracting, by the cloud server, key webpage content of the webpage corresponding to the bookmark; and sending, by the cloud server, the key webpage content corresponding to the bookmark to the client; and
    in response to determining that the prompting message indicates the function of webpage content offline downloading is not activated, storing, by the cloud server, the browser bookmark URL of the bookmark to a bookmark database without extracting the key webpage content of the webpage corresponding to the bookmark.

2. The method according to claim 1, before the step of sending the key webpage content to the client, the method further comprising:
    typesetting the key webpage content.

3. The method according to claim 1, wherein the key webpage content comprises the following information:
    when the webpage corresponding to the browser bookmark URL is a webpage of forum, the key webpage content of the webpage is theme and posts of the webpage of forum;
    when the webpage corresponding to the browser bookmark URL is a webpage of e-commerce production, the key webpage content of the webpage are parameters of production of the webpage of e-commerce production;
    when the webpage corresponding to the browser bookmark URL is a webpage of article, the key webpage content of the webpage is title of the article and the text of the article;
    when the webpage corresponding to the browser bookmark URL is a webpage of video, the key webpage content of the webpage is video content of the webpage of the video.

4. The method according to claim 1, wherein the browser bookmark URL information further comprises device type information of the client and network environment information of the client.

5. The method according to claim 4, wherein the step of sending the key webpage content to the client comprises:
    determining a device type of the client according to the device type information of client; when the device type of the client is determined to be a fixed device, sending the key webpage content to the client.

6. The method according to claim 5, further comprising:
    when the device type of the client is determined to be a mobile device, determining whether the client is in a connectable wireless network environment according to the network environment information of the client; when the client is determined to be in the connectable wireless network environment, sending the key webpage content to the client.

7. The method according to claim 6, further comprising:
    when the client is determined to be in the connectable wireless network environment, sending a notification message to the client; the notification message prompting whether downloading the webpage content is allowable; and
    sending the key webpage content to the client, when receiving a response message from the client from the client.

8. A method for sending webpage content of browser bookmark uniform resource locator (URL), comprising:
    receiving, by a cloud server, browser bookmark URL information sent from a local browser application on a client of a user, after the browser application logs in a user to a favorites folder of the browser application and triggers a browser bookmark URL synchronization function for synchronizing a bookmark stored in the favorites folder with the cloud server, the browser bookmark URL information comprising a browser bookmark URL of the bookmark and a prompting message indicating whether a function of webpage content offline downloading is activated in the client, wherein information being synchronized by the browser bookmark URL synchronization function includes the browser bookmark URL of the bookmark, and excludes content of a webpage corresponding to the bookmark;
    extracting, by the cloud server, key webpage content of the webpage corresponding to the bookmark; and
    after extracting the key webpage content, determining whether the function of webpage content offline downloading of the client is activated according to the prompting message;
    in response to determining that the prompting message indicates the function of webpage content offline downloading is activated, sending, by the cloud server, the key webpage content corresponding to the bookmark to the client,
    wherein in response to determining that the prompting message indicates the function of webpage content offline downloading is not activated, the cloud server does not send the key webpage content of the webpage corresponding to the bookmark to the client.

9. The method according to claim 8, wherein the key webpage content comprises the following information:
when the webpage corresponding to the browser bookmark URL is a webpage of forum, the key webpage content of the webpage is theme and posts of the webpage of forum;
when the webpage corresponding to the browser bookmark URL is a webpage of e-commerce production, the key webpage content of the webpage are parameters of production of the webpage of e-commerce production;
when the webpage corresponding to the browser bookmark URL is a webpage of article, the key webpage content of the webpage is title of the article and the text of the article;
when the webpage corresponding to the browser bookmark URL is a webpage of video, the key webpage content of the webpage is video content of the webpage of the video.

10. The method according to claim 8, wherein the step of sending the key webpage content to the client comprises:
determining a device type of the client according to a device type information of client; when the device type of the client is determined to be a fixed device, sending the key webpage content to the client.

11. The method according to claim 10, further comprising:
when the device type of the client is determined to be a mobile device, determining whether the client is in a connectable wireless network environment according to the network environment information of the client; when the client is determined to be in the connectable wireless network environment, sending the key webpage content to the client.

12. The method according to claim 11, further comprising:
when the client is determined to be in the connectable wireless network environment, sending a notification message to the client; the notification message prompting whether downloading the webpage content is allowable; and
sending the key webpage content to the client, when receiving a response message from the client.

13. A device for sending webpage content of browser bookmark uniform resource locator (URL) comprises at least a processor operating in conjunction with a memory and a plurality of units, the plurality of units comprising:
a receiving module configured to receive browser bookmark URL information sent from a local browser application on a client of a user, after the browser application logs in a user to a favorites folder of the browser application and triggers a browser bookmark URL synchronization function for synchronizing a bookmark stored in the favorites folder with the device, the browser bookmark URL information at least comprising a bookmark URL of the bookmark and a prompting message indicating whether a function of webpage content offline downloading is activated in the client, wherein information being synchronized by the browser bookmark URL synchronization function includes the browser bookmark URL of the bookmark, and excludes content of a webpage corresponding to the bookmark;
a determining module configured to determine whether the function of webpage content offline downloading of the client is activated according to the prompting message;
an extracting module configured to, in response to determining that the prompting message indicates the function of webpage content offline downloading is activated, extract key webpage content of the webpage corresponding to the bookmark;
a sending module configured to send the key webpage content corresponding to the bookmark to the client,
wherein in response to determining that the prompting message indicates the function of webpage content offline downloading is not activated, the device stores the browser bookmark URL of the bookmark to a bookmark database without extracting the key webpage content of the webpage corresponding to the bookmark.

14. The device according to claim 13, wherein the sending module further configured to typeset the key webpage content before sending the key webpage content to the client.

15. The device according to claim 13, wherein the key webpage content comprises the following information:
when the webpage corresponding to the browser bookmark URL is a webpage of forum, the key webpage content of the webpage is theme and posts of the webpage of forum;
when the webpage corresponding to the browser bookmark URL is a webpage of e-commerce production, the key webpage content of the webpage is parameters of production of the webpage of e-commerce production;
when the webpage corresponding to the browser bookmark URL is a webpage of article, the key webpage content of the webpage is title of the article and the text of the article;
when the webpage corresponding to the browser bookmark URL is a webpage of video, the key webpage content of the webpage is video content of the webpage of the video.

16. The device according to claim 13, wherein the browser bookmark URL information further comprises device type information of the client and network environment information of the client.

17. The device according to claim 16, wherein the sending module comprises:
a first determining sub-module configured to determine a device type of the client according to the device type information of client;
a sending sub-module configured to send the key webpage content to the client, when the device type of the client is determined to be a fixed device by the first determining sub-module.

18. The device according to claim 17, wherein the sending module further comprises:
a second determining sub-module configured to determine whether the client is in a connectable wireless network environment according to the network environment information of the client, when the device type of the client is determined to be a mobile device by the first determining sub-module;
when the device type of the client is determined to be a mobile device by the first determining sub-module and the client is determined to be in the connectable wireless network environment by the second determining sub-module, the sending sub-module further configured to send the key webpage content to the client.

19. The device according to the claim 18, wherein when the device type of the client is determined to be a mobile device by the first determining sub-module and the client is determined in the connectable wireless network environment by the second determining sub-module; the sending sub-module is further configured to send a notification message to the client; the notification message is configured to prompt whether downloading the webpage content is allowable; and the sending sub-module is further configured to send the key webpage content to the client, when receiving a response message from the client.

20. A device for sending webpage content of browser bookmark uniform resource locator (URL) comprises at least a processor operating in conjunction with a memory and a plurality of units, the plurality of units comprising:
a receiving module configured to receive browser bookmark URL information sent from a local browser application on a client of a user, after the browser application logs in a user to a favorites folder of the browser application and triggers a browser bookmark URL synchronization function for synchronizing a bookmark stored in the favorites folder with the device, the browser bookmark URL information at least comprising a bookmark URL of the bookmark and a prompting message indicating whether a function of webpage content offline downloading is activated in the client, wherein information being synchronized by the browser bookmark URL synchronization function includes the browser bookmark URL of the bookmark, and excludes content of a webpage corresponding to the bookmark;
an extracting module configured to extract key webpage content of the webpage corresponding to the bookmark;
a determining module configured to determine whether the function of webpage content offline downloading of the client is activated according to the prompting message, after the key webpage content is extracted;
a sending module configured to send the key webpage content corresponding to the bookmark to the client, in response to determining that the prompting message indicates the function of the webpage content offline downloading is activated,
wherein in response to determining that the prompting message indicates the function of webpage content offline downloading is not activated, the device does not send the key webpage content of the webpage corresponding to the bookmark to the client.

21. The device according to claim 20, wherein the key webpage content comprises the following information:
when the webpage corresponding to the browser bookmark URL is a webpage of forum, the key webpage content of the webpage is theme and posts of the webpage of forum;
when the webpage corresponding to the browser bookmark URL is a webpage of e-commerce production, the key webpage content of the webpage is parameters of productions of the webpage of e-commerce productions;
when the webpage corresponding to the browser bookmark URL is a webpage of article, the key webpage content of the webpage is title of the article and the text of the article;
when the webpage corresponding to the browser bookmark URL is a webpage of video, the key webpage content of the webpage is video content of the webpage of the video.

22. The device according to claim 20, wherein the sending module comprises:
a third determining sub-module configured to determine a device type of the client according to the device type information of client, when the function of webpage content offline downloading is determined to be started by the determining module;
a second sending sub-module configured to send the key webpage content to the client, when the device type of the client is determined to be a fixed device by the third determining sub-module.

23. The device according to claim 22, wherein the sending module further comprises:
a fourth determining sub-module configured to determine whether the client is in a connectable wireless network environment according to the network environment information of the client, when the device type of the client is determined to be a mobile device by the third determining sub-module;
the second sending sub-module is further configured to send the key webpage content to the client, when the device type of the client is determined to be a mobile device by the third determining sub-module and the client is determined to be in the connectable wireless network environment by the third determining sub-module.

24. The device according to claim 23, wherein when the device type of the client is determined to be a mobile device by the third determining sub-module and the client is determined to be in a non-connectable wireless network environment by the fourth determining sub-module, the sending sub-module is further configured to send a notification message to the client; the notification message is configured to prompt whether downloading the webpage content is allowable; and the sending sub-module is further configured to send the key webpage content to the client, when receiving a response message from the client.

* * * * *